United States Patent
Accapadi et al.

(10) Patent No.: US 7,278,141 B2
(45) Date of Patent: Oct. 2, 2007

(54) SYSTEM AND METHOD FOR ADDING PRIORITY CHANGE VALUE CORRESPONDING WITH A LOCK TO A THREAD DURING LOCK PROCESSING

(75) Inventors: Jos Manuel Accapadi, Austin, TX (US); Andrew Dunshea, Austin, TX (US); Dirk Michel, Austin, TX (US); James W. Van Fleet, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 902 days.

(21) Appl. No.: 10/422,037

(22) Filed: Apr. 23, 2003

(65) Prior Publication Data

US 2004/0216112 A1 Oct. 28, 2004

(51) Int. Cl.
*G06F 9/46* (2006.01)
(52) U.S. Cl. ........................................ 718/103; 718/102
(58) Field of Classification Search .................... 718/1, 718/102–104; 713/400
See application file for complete search history.

(56) References Cited

U.S. PATENT DOCUMENTS

| | | | | |
|---|---|---|---|---|
| 5,241,676 | A * | 8/1993 | Kubo | 718/103 |
| 5,247,675 | A | 9/1993 | Farrell et al. | 395/650 |
| 5,515,538 | A | 5/1996 | Kleiman | 395/733 |
| 5,524,247 | A | 6/1996 | Mizuno | 395/726 |
| 5,630,128 | A | 5/1997 | Farrell et al. | 395/673 |
| 5,745,778 | A | 4/1998 | Alfieri | 395/800.01 |
| 5,826,081 | A | 10/1998 | Zolnowsky | 395/673 |
| 5,946,711 | A | 8/1999 | Donnelly | 711/152 |
| 6,105,051 | A | 8/2000 | Borkenhagen et al. | 709/103 |
| 6,167,424 | A * | 12/2000 | Bak et al. | 718/100 |
| 6,212,544 | B1 | 4/2001 | Borkenhagen et al. | 709/103 |
| 6,338,078 | B1 | 1/2002 | Chang et al. | 709/102 |
| 6,427,195 | B1 | 7/2002 | McGowen et al. | 711/153 |
| 6,430,593 | B1 * | 8/2002 | Lindsley | 718/103 |
| 6,434,591 | B1 | 8/2002 | Watakabe et al. | 709/103 |
| 6,477,562 | B2 * | 11/2002 | Nemirovsky et al. | 718/108 |
| 6,587,955 | B1 * | 7/2003 | Foote et al. | 713/400 |
| 6,845,504 | B2 * | 1/2005 | Hua et al. | 718/104 |

FOREIGN PATENT DOCUMENTS

| | | |
|---|---|---|
| JP | 02-126330 | 5/1990 |
| JP | 06-187175 | 7/1994 |
| JP | 07-230387 | 8/1995 |
| JP | 08-077025 | 3/1996 |
| JP | 11-249916 | 9/1999 |
| JP | 2001-125799 | 5/2001 |

OTHER PUBLICATIONS

Macon, Jr. et al., "Maintaining Application Compatibility in Multiprocessor Environments," IBM Technical Disclosure Bulletin, vol. 38., No. 8, p. 333-34, Aug. 1995.
"Lock Priority Boosting in an MP System with Multiple Run Queues," IBM Research Disclosure, p. 174, Jan. 2001.

* cited by examiner

*Primary Examiner*—Meng-Al T. An
*Assistant Examiner*—Eric C Wai
(74) *Attorney, Agent, or Firm*—VanLeeuwen & VanLeeuwen; Marilyn S. Dawkins

(57) ABSTRACT

A system and method is altering the priority of a process, or thread of execution, when the process acquires a software lock. The priority is altered when the lock is acquired and restored when the process releases the lock. Thread priorities can be altered for every lock being managed by the operating system or can selectively be altered. In addition, the amount of alteration can be individually adjusted so that a process that acquires one lock receive a different priority boost than a process that acquires a different lock. Furthermore, a method of tuning a computer system by adjusting lock priority values is provided.

17 Claims, 5 Drawing Sheets

SYSTEM AND METHOD FOR ADDING PRIORITY CHANGE VALUE CORRESPONDING WITH A LOCK TO A THREAD DURING LOCK PROCESSING

BACKGROUND OF THE INVENTION

1. Technical Field

The present invention relates in general to a system and method for improving software lock efficiency. More specifically, the present invention relates to a system and method for increasing and decreasing thread priorities during lock processing.

2. Description of the Related Art

Modern computer systems perform multiple tasks seemingly at the same time. Using multitasking, the processor handles instructions from multiple processes by servicing the processes in a round-robin fashion. In this manner, a process is executed by the processor for a small amount of time before it is time sliced, it's settings and register values saved, a different process is executed by the processor. These processes, or "threads," are a stream of instructions corresponding to one or more software applications that require handling by the processor. The terms "process" and "thread" are used herein interchangeably to note a stream of executable instructions that is executed by a processor. By quickly moving from one process to the next, it appears that each process is executed simultaneously.

The operating system regulates access to the processor. Most operating systems employ priority-based scheduling algorithms for this purpose. Priorities are assigned to programs according to the importance and/or urgency of the functions that are performed on behalf of the computer system. The operating system uses these priorities to determine when and for how long a process or unit of executable code within the programs (hereafter, "thread") is granted access to the processor. Generally, priority-based scheduling allocates processor time to optimize the computer system's performance. For example, the computer system may be optimized in order to minimize user input response time, maximize throughput, and/or guarantee predictable, or deterministic, execution times for application programs.

Many resources within a computer system are shared by the various programs being executed by the processor. In many cases, these resources need to be serialized so that only one process is using the resource in any given time. In order to serialize access to the resource, software locks are often used. When a resource is being used by another process, a process will wait on the lock. When the lock is released by the other process, the process will attempt to acquire the lock. Other processes will be unable to use the resource until the process releases the lock. Because of this serialization, efficient use of shared resources helps improve overall system throughput. This is especially true of resources and corresponding locks that are used by many processes.

In an operating system using a priority-based scheduling algorithm, a process with an inferior priority may be preempted by a process of the superior priority. This is true even when the inferior priority process currently possesses a critical resource. A challenge in traditional operating systems is the apparent conflict between preempting inferior priority processes and, at the same time efficiently handling the use of critical resources.

What is needed, therefore, is a system and method to temporarily alter a thread's priority without overly impacting the priority-based scheduling algorithm being employed by the operating system. What is also needed is a system and method to allow tuning of software locks corresponding to individual resources in order to maximize system efficiency.

SUMMARY

It has been discovered that the aforementioned challenges are resolved using a system and method to temporarily alter a thread's priority when the thread acquires a software lock. In most cases, the thread's priority would be improved so that the thread has a better likelihood of completing its use of the shared resource controlled by the lock before being preempted. After the thread's priority has been increased, other threads with the same priority would be less likely to preempt the thread, while threads with superior priority would still be able to preempt the thread. In this manner, the system's priority-based scheduling algorithm is adhered to while still giving preferential treatment to threads that hold critical locks.

When the thread releases the lock, the system automatically adjusts the thread's priority by the amount it was previously altered. For example, if a thread's priority was altered from 20 to 30 upon acquiring the lock, the priority upon release of the lock is subtracted by 10. In this manner, if the thread had been penalized during its use of the lock for inefficient use of resources, say from 30 to 28, the priority upon release of the lock would be 18 instead of the original 20.

In one embodiment, locks are tuned so that threads acquiring the locks receive different priority boosts. For example, it may have been found that overall system efficiency is improved if one critical lock provides a boost of 10 to threads that acquire it, while another lock may only provide a boost of 5 to threads that acquire it, and yet another lock may not provide any boost whatsoever. In this manner, overall system performance can be tuned by adjusting individual boost values. Furthermore, in some situations it may be advantageous to actually decrease the lock's priority, in which case a negative value can be applied to the thread's priority when the thread acquires the lock.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1A:
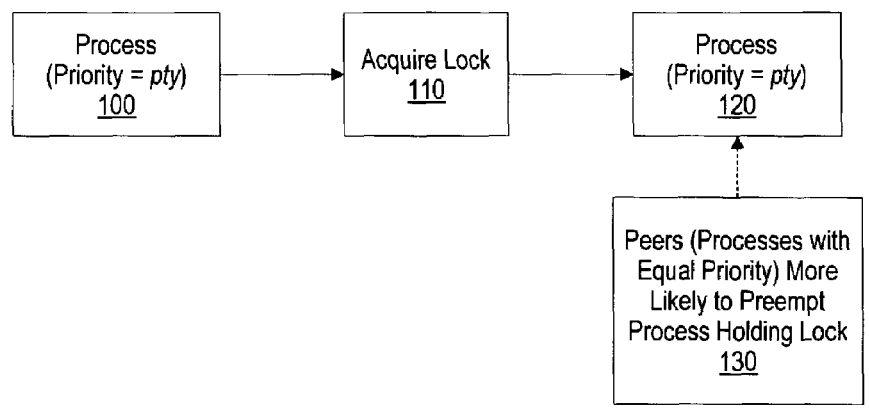
FIG. 1A is a block diagram showing that in a traditional (prior art) system a thread's priority is not altered when the thread acquires a lock.

FIG. 1A is a block diagram showing that in a traditional (prior art) system a thread's priority is not altered when the thread acquires a lock. In order to use a shared resource, a process, with a given priority, sets out to acquire a lock that controls access to the resource (step 100). When the resource becomes available, the process acquires the lock that controls access (step 110). The process now uses the shared resource with its original (i.e., unaltered) priority value (step 120). Because the process has not been granted a preferential priority, peer processes (i.e., those processes with the same priority as the lock-holding process) are more likely to preempt the lock-holding process (step 130) as the operating system will not treat the lock-holding process preferentially.

Figure 1B:
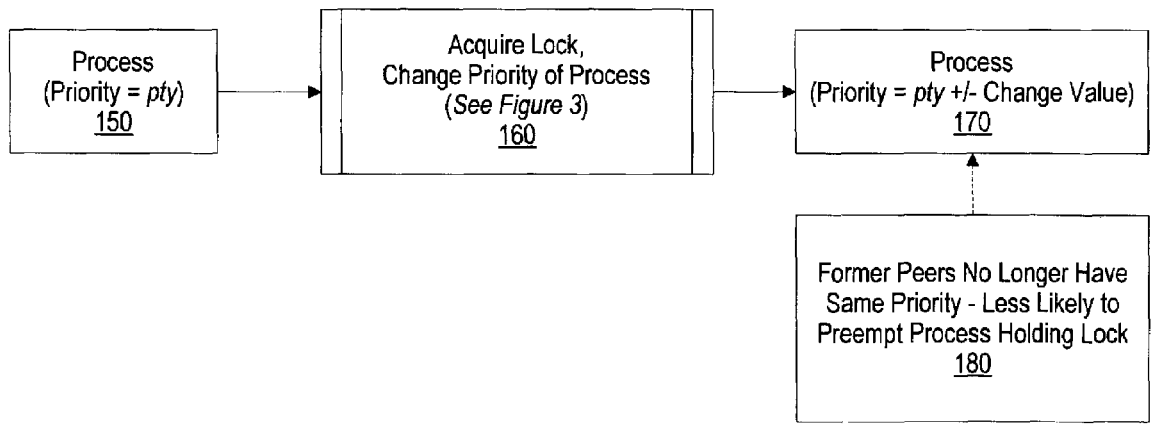
FIG. 1B is a block diagram showing a thread's priority is being altered when the thread acquires a lock.

FIG. 1B is a block diagram showing a thread's priority is being altered when the thread acquires a lock. In contrast to the traditional system shown in FIG. 1A, in FIG. 1B, the same process sets out to acquire a lock that controls a shared resource (step 150). However, unlike the process shown in FIG. 1A, in FIG. 1B the priority of the process is altered while the process holds the lock (predefined process 160, see FIG. 3 for processing details). The process now uses the shared resource with an altered (i.e., more preferential) priority value (step 170). Because the process has been granted a preferential priority, peer processes (i.e., those processes with priority values equal to the lock-holding process' original priority) are less likely to preempt the lock-holding process (step 130). The less likely the process is of being preempted, the faster the process is going to be able to finish using the shared resource, thus freeing the shared resource for other processes.

Figure 2:
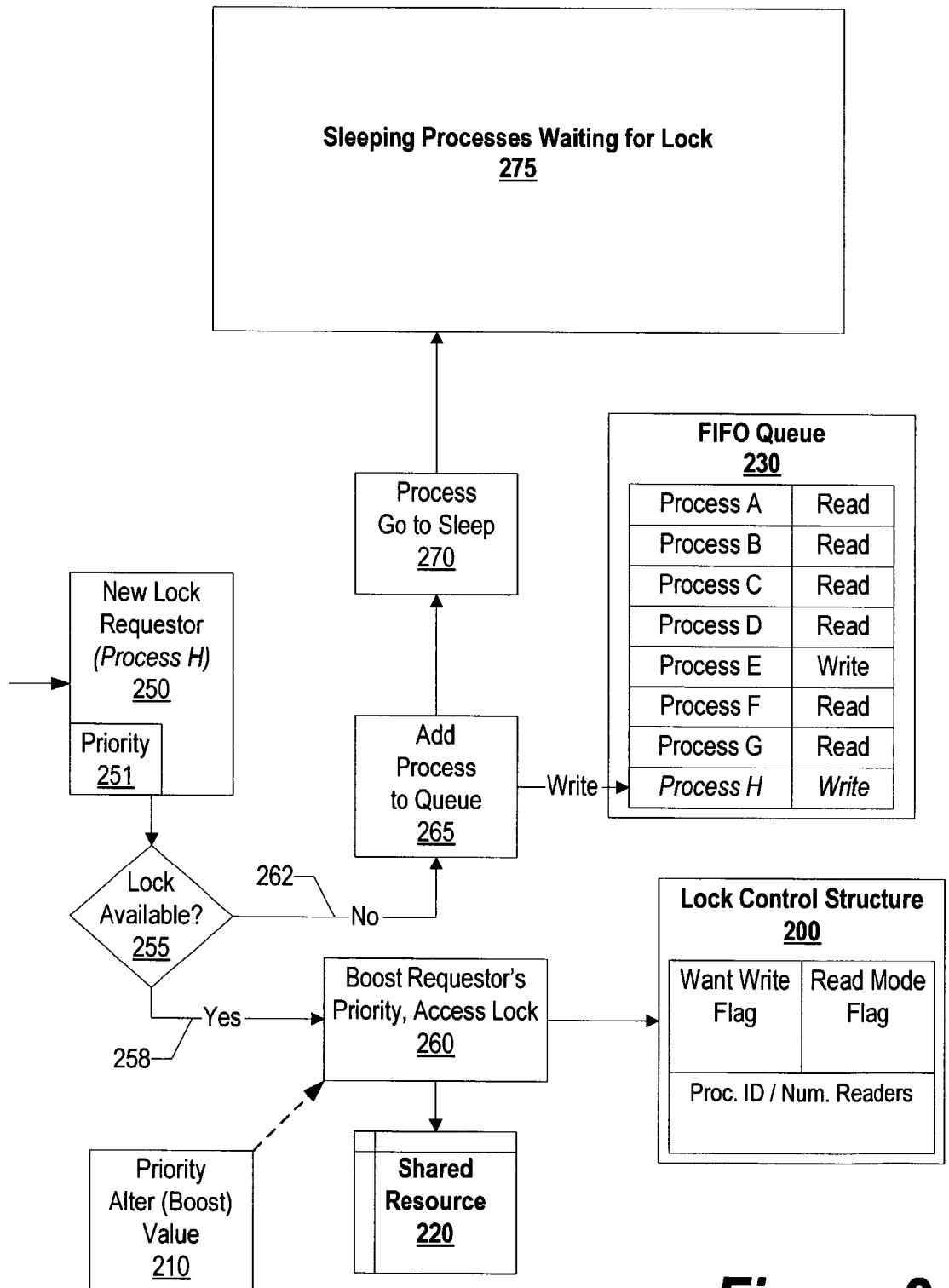
FIG. 2 is a high level flowchart of a process having its priority altered upon acquiring a lock.

FIG. 2 is a high level flowchart of a process having its priority altered upon acquiring a lock. New lock requester (process H) requests a lock that controls access to shared resource 220 (step 250). The lock requestor has priority 251 associated with it which is used by the operating system in its priority-based scheduling algorithm.

A determination is made as to whether the requested lock is currently available (decision 255). If the lock is not currently available, decision 255 branches to "no" branch 262 whereupon information regarding the requesting process is added to queue 230 (step 265). Queue 230 is a FIFO queue used to store information about processes waiting for a lock that controls access to shared resource. If the lock is not soon available, the requesting process is put to sleep (step 270) so that it does not continue to receive processing time from the processor until the lock becomes available and it is awaken. Many processes can be sleeping, waiting for a lock to become available, as is shown by sleeping processes 275.

Returning to decision 255, if the lock is available, decision 255 branches to "yes" branch 258 whereupon the requesting process' priority is altered and the requesting process receives access to shared resource 220 (step 260). Lock control structure 200 is used to maintain data about the lock including the process identifier of the process that currently holds the lock.

In one embodiment, a priority alter, or boost, value 210 is read from a memory area. In this manner, the priority boost value can be changed to improve lock or system performance. In addition, an algorithm can be used so that the priority is not simply incremented by a given amount. For example, the priority may be increased more if the process is a low-priority process so that the low-priority process has a better chance of finishing with the shared resource before being preempted.

Figure 3:
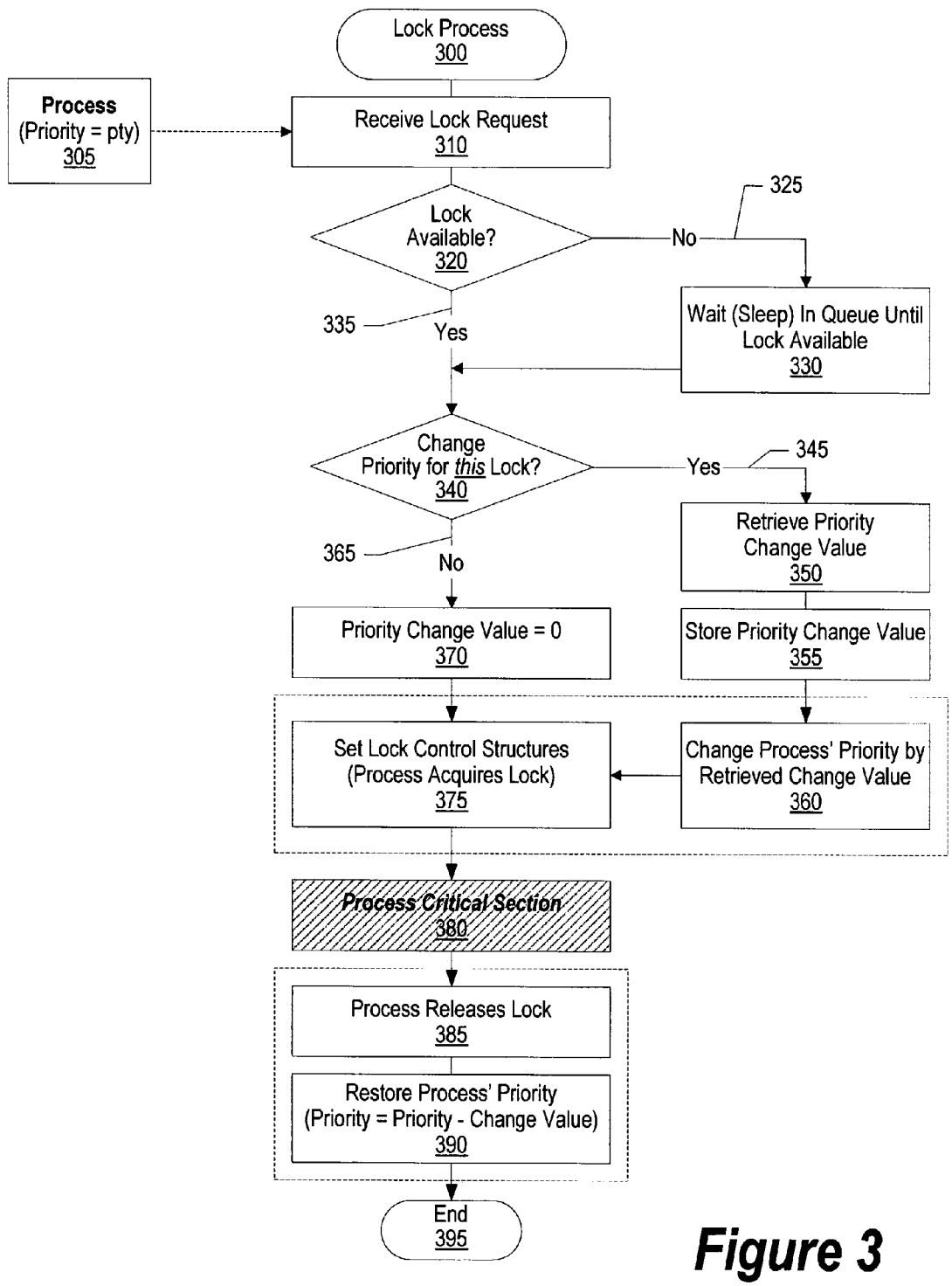
FIG. 3 is a flowchart showing the steps taken to alter a thread's priority when the thread acquires a lock and to restore the thread's priority when the thread releases the lock.

FIG. 3 is a flowchart showing the steps taken to alter a thread's priority when the thread acquires a lock and to restore the thread's priority when the thread releases the lock. Processing commences at 300 whereupon a lock request is received (step 310) from process 305 that has a given priority value.

A determination is made as to whether the requested lock is available (decision 320). If the lock is not available, decision 320 branches to "no" branch 325 whereupon the requesting process waits until the lock becomes available (step 330). During this time, the process may "spin," or wait for the lock without going to sleep, or the process may be put to sleep until the lock becomes available.

If the lock is available (whereupon decision 320 branches to "yes" branch 335) or when the lock becomes available for a waiting process, another determination is made as to whether to change the process' priority for this lock (decision 340). In some environments, it may be advantageous to change the priority when any lock in the system is acquired, while in other environments it may be advantageous to only change the priority when selected locks are acquired. If the process' priority will be changed as a result of acquiring this lock, decision 340 branches to "yes" branch 345 whereupon the priority change, or boost, value is retrieved (step 350), stored (step 355), applied by changing the process' priority by the change value accordingly (step 360), and set the lock control structures (step 375). As described above, in one embodiment the priority change value is a constant value, while in other embodiments the priority change value may variable so that different processes receive different levels of boosting. Also, in one embodiment the steps of changing the process' priority and setting the lock control structures is performed in an atomic, or quasi-atomic, fashion so that the steps are performed successively and quickly with little or no chance of the process being preempted between the two steps.

Returning to decision 340, if the priority of processes acquiring this lock is not being altered, decision 340 branches to "no" branch 365 whereupon the priority change value is set to zero indicating that the process' priority was not altered (step 370) and lock control structures are set so that the process acquires the lock (step 375).

Once the process has acquired the lock, the process executes its critical section of instructions that likely read or write values to the shared resource, access to which is being controlled by the lock (step 380). When the process is finished using the shared resource, the process releases the lock (step 385) so that another process can use the shared resource and the process' priority is restored by subtracting the change value that was stored in step 355 from the process' current priority (step 390). Note that while the process' original priority could be stored in step 355 and restored in step 390, adjusting the priority by the change value ensures that any priority changes that occurred during the process' use of the shared resource remain intact. For example, the process may have been penalized and had its priority reduced because of the process' inefficient use of the resource. Because these penalties were assessed by the system, it may be advantageous to preserve such penalties when restoring the process' priority. In addition, in one embodiment the steps of releasing the lock and restoring the process' priority are performed in an atomic, or quasi-atomic, fashion so that the process only has the increased priority during the time it holds the lock and not thereafter. Lock boost processing thereafter ends at 395.

Figure 4:
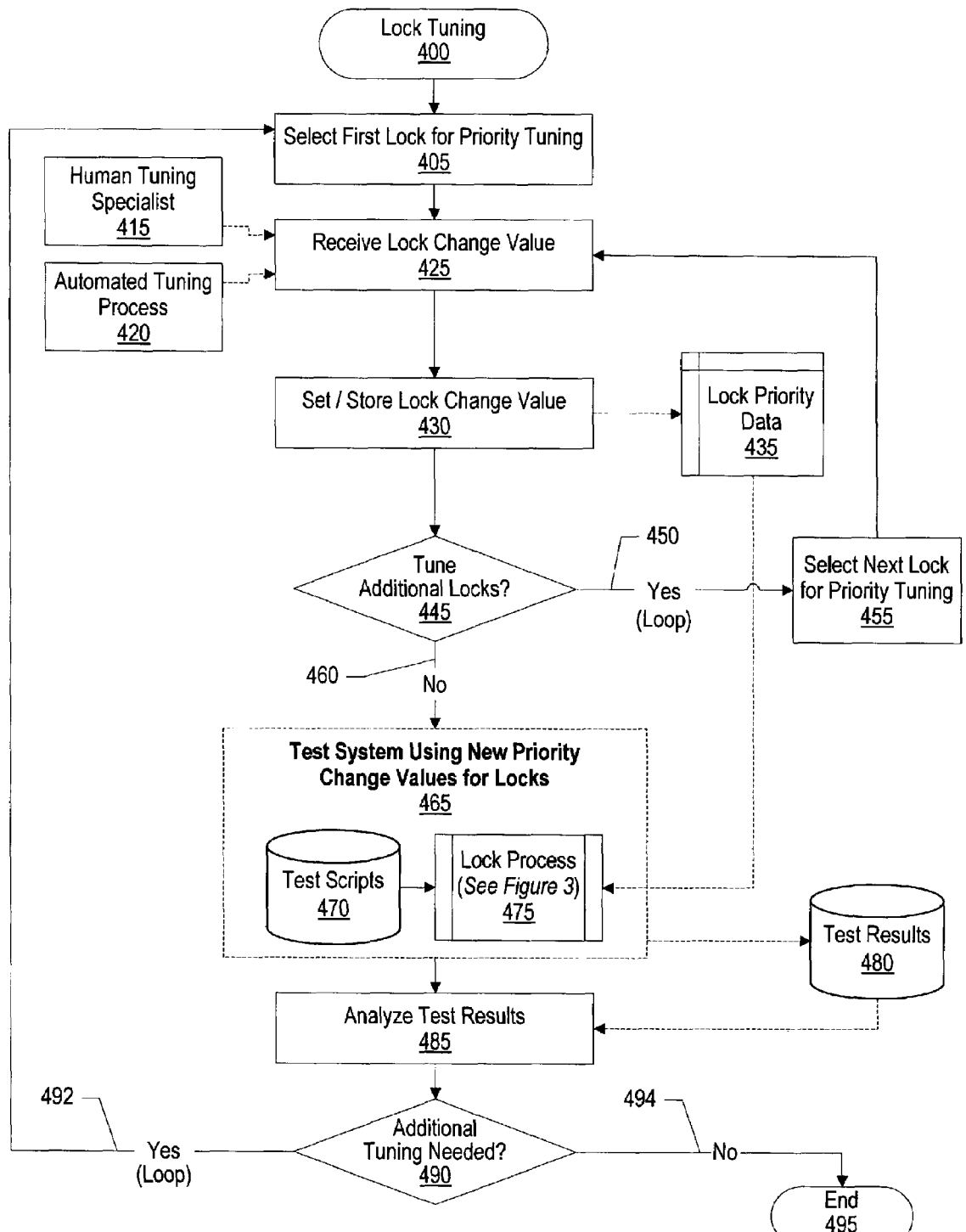
FIG. 4 is a flowchart showing the steps taken to tune a computer system by altering lock priority boost values.

FIG. 4 is a flowchart showing the steps taken to tune a computer system by altering lock priority boost values. Processing commences at 400 whereupon a first lock is selected for priority tuning (step 405). A lock change value is received (step 425) from either human tuning specialist 415 (i.e., a person trained in tuning computer systems) or by automated tuning process 420 (i.e., a process that uses a neural network or other form of artificial intelligence to determine lock change values).

The received lock change value is set, or stored (step 430) in lock priority data memory area 435. A determination is then made as to whether additional locks need to be tuned (decision 445). If there are additional locks that need to be tuned, decision 445 branches to "yes" branch 450 whereupon the next lock to be tuned is selected (step 455) and processing loops back to receive a lock change value for the lock and store the value in the lock priority data memory area. This looping continues until there are no more locks to tune, at which point decision 445 branches to "no" branch 460 and the system is tested (step 465) using the newly stored lock change values.

In step 465, test scripts 470 stored on nonvolatile storage device 470 are read to execute various locking scenarios using the lock boosting process (predefined process 475, see FIG. 3 for processing details). The lock boosting process uses the lock change values stored in memory area 435. Results of the testing, such as the length of time locks are held as well as overall system throughput figures are written to test results data store 480.

Following system testing, the test results are analyzed (step 485). These results can be analyzed by human tuning specialists 415, automated processes 420, or a combination thereof. In response to the analysis, a determination is made as to whether additional lock priority tuning is needed (decision 490). If additional tuning is needed, decision 490 branches to "yes" branch 492 whereupon processing loops back to select locks and their corresponding lock change values. This looping continues until additional tuning is no longer needed, at which point decision 490 branches to "no" branch 494 whereupon lock tuning processing ends at 495.

Figure 5:
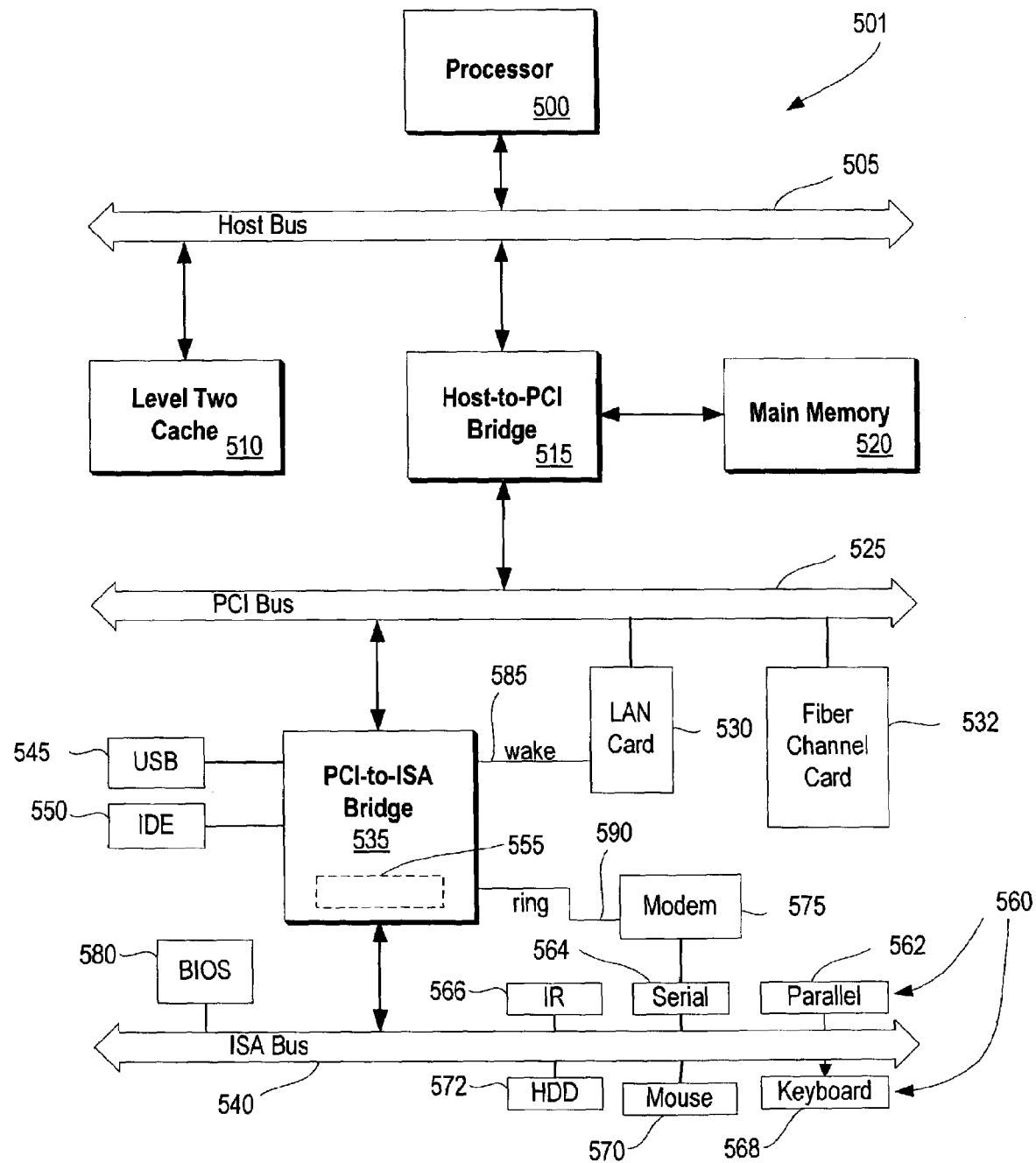
FIG. 5 is a block diagram of a computing device capable of implementing the invention described herein.

FIG. 5 illustrates information handling system 501 which is a simplified example of a computer system capable of performing the systems and methods described herein. Computer system 501 includes processor 500 that is coupled to host bus 505. A level two (L2) cache memory 510 is also coupled to the host bus 505. Host-to-PCI bridge 515 is coupled to main memory 520, includes cache memory and main memory control functions, and provides bus control to handle transfers among PCI bus 525, processor 500, L2 cache 510, main memory 520, and host bus 505. PCI bus 525 provides an interface for a variety of devices including, for example, LAN card 530. PCI-to-ISA bridge 535 provides bus control to handle transfers between PCI bus 525 and ISA bus 540, universal serial bus (USB) functionality 545, IDE device functionality 550, power management functionality 555, and can include other functional elements not shown, such as a real-time clock (RTC), DMA control, interrupt support, and system management bus support. Peripheral devices and input/output (I/O) devices can be attached to various interfaces 560 (e.g., parallel interface 562, serial interface 564, infrared (IR) interface 566, keyboard interface 568, mouse interface 570, and fixed disk (FDD) 572 coupled to ISA bus 540. Alternatively, many I/O devices can be accommodated by a super I/O controller (not shown) attached to ISA bus 540.

BIOS 580 is coupled to ISA bus 540 and incorporates the necessary processor executable code for a variety of low-level system functions and system boot functions. BIOS 580 can be stored in any computer readable medium, including magnetic storage media, optical storage media, flash memory, random access memory, read only memory, and communications media conveying signals encoding the instructions (e.g., signals from a network). In order to attach computer system 501 another computer system to copy files over a network, LAN card 530 is coupled to PCI-to-ISA bridge 535. Similarly, to connect computer system 501 to an ISP to connect to the Internet using a telephone line connection, modem 575 is connected to serial port 564 and PCI-to-ISA Bridge 535.

While the computer system described in FIG. 5 is capable of executing the processes described herein, this computer system is simply one example of a computer system. Those skilled in the art will appreciate that many other computer system designs are capable of performing the processes described herein.

One of the preferred implementations of the invention is a client application, namely, a set of instructions (program code) in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that is a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method for altering a priority of a thread of execution that is being executed by a computer operating system, said method comprising:
   receiving a request for a software lock from the thread, wherein the software lock is a data structure used to control access to a shared resource;
   determining that the software lock is available;
   granting the thread access to the shared resource in response to the determination;
   retrieving a priority change value corresponding to the software lock;
   altering the priority of the thread in conjunction with the granting by adding the priority change value to the priority of the thread;
   receiving a release instruction from the thread;
   revoking the access previously granted in response to receiving the release instruction; and
   readjusting the priority of the thread in conjunction with the revoking by subtracting the priority change value from the priority of the thread.

2. The method of claim 1 further comprises:
   after the altering, applying an algorithm to the priority of the thread, the application resulting in a new priority;
   determining a penalty value between the priority and the new priority;
   storing the penalty value; and
   readjusting the priority of the thread by subtracting the penalty value and the priority change value in response to the thread releasing the software lock.

3. The method of claim 1 further comprising:
   initializing a plurality of priority change values prior to receiving the request, each of the priority change values corresponding to a different software lock; and
   retrieving the priority change value corresponding to the requested software lock prior to the altering, wherein the altering includes adjusting the priority change value by the retrieved priority change value by adding the priority change value to the priority of the thread.

4. The method of claim 3 further comprising:
   testing the computer operating system following the initialization of the plurality of priority change values; and
   changing one or more of the plurality of priority change values in response to the testing.

5. The method of claim 1 wherein the software lock is determined to be available regardless of the priority of the thread, and wherein the thread is granted access to the shared resource even when the priority of the thread is greater than the priority change value that corresponds to the software lock.

6. The method of claim 1 wherein the priority change value corresponding to the software lock is retrieved from a plurality of priority change values that correspond to the software lock, the method further comprising:
   selecting the retrieved priority change value from the plurality of priority change values based upon an identifier that corresponds to the thread.

7. An information handling system comprising:
   one or more processors;
   a memory accessible by the processors;
   a nonvolatile storage device accessible by the processors;
   a computer operating system for controlling the use of the processors, the memory, and the storage device, the computer operating system including one or more software lock data structures used to control access to shared resources;
   a software lock tool for altering a priority of a thread of execution that is being executed by the computer operating system, the software lock tool performing steps that include:
      altering a priority of a thread of execution that is being executed by a computer operating system, said method comprising:
      receiving a request for a software lock from the thread, wherein the software lock is a data structure used to control access to a shared resource;
      determining that the software lock is available;
      granting the thread access to the shared resource in response to the determination;
      retrieving a priority change value corresponding to the software lock;
      altering the priority of the thread in conjunction with the granting by adding the priority change value to the priority of the thread;
      receiving a release instruction from the thread;
      revoking the access previously granted in response to receiving the release instruction; and
      readjusting the priority of the thread in conjunction with the revoking by subtracting the priority change value from the priority of the thread.

8. The information handling system of claim 7 with additional steps comprising:
   after the altering, applying an algorithm to the priority of the thread, the application resulting in a new priority;
   determining a penalty value between the priority and the new priority;
   storing the penalty value; and
   readjusting the priority of the thread by subtracting the penalty value and the priority change value in response to the thread releasing the software lock.

9. The information handling system of claim 7 wherein the software lock tool performs further steps comprising:
   initializing a plurality of priority change values prior to receiving the request, each of the priority change values corresponding to a different software lock; and
   retrieving the priority change value corresponding to the requested software look prior to the altering, wherein the altering includes adjusting the priority change value by the retrieved priority change value by adding the priority change value to the priority of the thread.

10. The information handling system of claim 7 wherein the software lock is determined to be available regardless of the priority of the thread, and wherein the thread is granted access to the shared resource even when the priority of the thread is greater than the priority change value that corresponds to the software lock.

11. The information handling system of claim 7 wherein the priority change value corresponding to the software lock is retrieved from a plurality of priority change values that correspond to the software lock, wherein the software lock tool performs further steps comprising:
   selecting the retrieved priority change value from the plurality of priority change values based upon an identifier that corresponds to the thread.

12. A computer program product stored in a computer storage media for altering a priority of a thread of execution that is being executed by a computer operating system, said computer program product including instructions that, when executed by an information handling system, causes the information handling system to perform actions comprising:
- receiving a request for a software lock from the thread, wherein the software lock is a data structure used to control access to a shared resource;
- determining that the software lock is available;
- granting the thread access to the shared resource in response to the determination;
- retrieving a priority change value corresponding to the software lock;
- altering the priority of the thread in conjunction with the granting by adding the priority change value to the priority of the thread;
- receiving a release instruction from the thread;
- revoking the access previously granted in response to receiving the release instruction; and
- readjusting the priority of the thread in conjunction with the revoking by subtracting the priority change value from the priority of the thread.

13. The computer program product of claim 12 wherein the actions further comprise:
- after the altering, applying an algorithm to the priority of the thread, the application resulting in a new priority;
- determining a penalty value between the priority and the new priority;
- storing the penalty value; and
- readjusting the priority of the thread by subtracting the penalty value and the priority change value in response to the thread releasing the software lock.

14. The computer program product of claim 12 wherein the actions further comprise:
- initializing a plurality of priority change values prior to receiving the request, each of the priority change values corresponding to a different software lock; and
- retrieving the priority change value corresponding to the requested software lock prior to the altering, wherein the altering includes adjusting the priority change value by the retrieved priority change value by adding the priority change value to the priority of the thread.

15. The computer program product of claim 14 further comprising:
- testing the computer operating system following the initialization of the plurality of priority change values; and
- changing one or more of the plurality of priority change values in response to the testing.

16. The computer program product of claim 12 wherein the software lock is determined to be available regardless of the priority of the thread, and wherein the thread is granted access to the shared resource even when the priority of the thread is greater than the priority change value that corresponds to the software lock.

17. The computer program product of claim 12 wherein the priority change value corresponding to the software lock is retrieved from a plurality of priority change values that correspond to the software lock, wherein the actions further comprise:
- selecting the retrieved priority change value from the plurality of priority change values based upon an identifier that corresponds to the thread.

* * * * *